United States Patent [19]

Alvarez

[11] Patent Number: 4,494,611

[45] Date of Patent: Jan. 22, 1985

[54] APPARATUS FOR PROCESSING SOIL FOR PLANTING

[76] Inventor: Guillermo D. Alvarez, 16 Searing St., Dover, N.J. 07801

[21] Appl. No.: 347,873

[22] Filed: Feb. 11, 1982

[51] Int. Cl.³ .................. A01B 43/00; A01B 35/16
[52] U.S. Cl. .................................. 172/32; 171/9; 171/13; 171/45; 171/78; 171/116; 171/124; 171/135; 171/142; 209/616; 209/634; 209/654; 241/109; 241/115; 241/124; 241/139; 241/74
[58] Field of Search .................. 172/32, 33, 50, 67; 171/9, 10, 12–18, 45, 46, 78, 112–116, 124, 132, 135, 142; 209/629, 634, 654, 616; 241/109, 110, 117, 121, 134, 135, 139, 166, 167, 68, 74, 75, 115, 116

[56] References Cited

U.S. PATENT DOCUMENTS

| | | | |
|---|---|---|---|
| 18,899 | 12/1857 | Hardenbergh | 171/114 X |
| 200,263 | 2/1878 | Daverio | 241/109 X |
| 333,389 | 12/1885 | Carlin | 241/121 X |
| 624,774 | 5/1899 | Ellin | 241/109 X |
| 1,070,423 | 8/1913 | Curtis | 172/33 |
| 1,209,848 | 12/1916 | Kernin et al. | |
| 1,578,859 | 3/1926 | Snider | 172/67 X |
| 1,895,006 | 1/1933 | Rapp | 241/110 |
| 2,060,688 | 11/1936 | Pryor et al. | 172/33 |
| 2,217,118 | 10/1940 | Jesson et al. | 241/109 X |
| 2,426,434 | 8/1947 | Chapman | 241/109 |
| 2,630,051 | 3/1953 | Palmer | 171/45 X |
| 2,725,700 | 12/1955 | Fahrenholz | 171/45 X |
| 2,751,830 | 6/1956 | Stauffer | 172/33 |
| 2,754,736 | 7/1956 | Lynn | 172/33 |
| 3,828,859 | 8/1974 | Alverez | 172/50 |
| 3,920,077 | 11/1975 | Lely | 172/67 X |
| 4,014,390 | 3/1977 | Teixeira | 171/124 |
| 4,313,502 | 2/1982 | Nelson | 172/33 X |

FOREIGN PATENT DOCUMENTS

| | | | |
|---|---|---|---|
| 760222 | 6/1967 | Canada . | |
| 965068 | 3/1975 | Canada | 241/110 |
| 854457 | 11/1952 | Fed. Rep. of Germany | 241/121 |
| 1122224 | 1/1962 | Fed. Rep. of Germany | 241/139 |
| 1253024 | 10/1967 | Fed. Rep. of Germany | 241/110 |
| 40594 | 5/1907 | Switzerland | 241/115 |
| 315678 | 7/1929 | United Kingdom . | |
| 772358 | 4/1957 | United Kingdom | 172/32 |

Primary Examiner—Paul E. Shapiro
Attorney, Agent, or Firm—Philip H. Gottfried

[57] ABSTRACT

An improvement is presented in an apparatus for processing soil for planting wherein a separator are provided for initially separating rocks and other large objects from soil prior to crushing thereof, the separator comprising a plurality of respectively upwardly and downwardly directed pins which cooperate in the removal of said rocks and other large objects from the soil. Also provided is a vertical rotatable power driven shaft centrally located in said apparatus wherein a plurality of radially extending arms are fixed thereto and are rotatable with the shaft. Some of said separating pins are fixed to the arms and some cooperating separating pins are fixed to a disc plate also mounted about said power driven shaft. A rotating plurality of discs crush said soil to reduce large particles and destroy weed seeds, insects, and larvae.

12 Claims, 5 Drawing Figures

APPARATUS FOR PROCESSING SOIL FOR PLANTING

BACKGROUND OF THE INVENTION

The present invention is directed to a method and apparatus for removing stones and other objects from the surface of cleared ground and removing a predetermined layer of top soil from the ground and treating said top soil by milling and crushing such that unwanted wild seeds and weeds, insects, their eggs and larva are destroyed, without the use of herbicides or insecticides. The soil is then returned to the swath from which it was removed in an improved condition, ready for planting. The method and apparatus may be utilized on any cleared property and is applicable to the property whether it has been farmed before. It is also possible with the apparatus and method disclosed herein to apply either liquid or solid fertilizer in the same operation and to actually plant the seed crop.

Ordinary farming methods generally require several different steps and involve separate pieces of apparatus requiring several passes over the same area. The tilling of the soil to prepare it for planting, "while disrupting and turning under" the weeds, grass and old crop, does not generally break up such organic matter to a sufficient degree to prevent such matter from competing with the planted crop for nutrition. Frequent weeding and cultivation during the growing season are therefore sometimes required. In addition, insects, their eggs and other larva remain alive in the soil after tilling and are harmful to the growing crop and upset the natural ecological balance. The usual manner of dealing with insects, their eggs and other larva has been with the use of insecticides which are expensive and costly to apply and which in some instances pose an environmental problem.

The method and apparatus disclosed in this invention, negate the need for herbicides and insecticides and through mechanical means, effectively process the soil to a texture suitable for planting. The current invention accomplishes much the same task as my previous invention disclosed in U.S. Pat. No. 3,888,859, granted on Aug. 13, 1974 however, the present invention represents a new and different embodiment which permits the method to be practiced with the use of conventional farm machinery serving as the locomoting force.

In addition, the apparatus disclosed herein may be used in a stationary position wherein soil can be fed through the apparatus for processing and then returned to its source by any of a number of independent means.

SUMMARY OF THE INVENTION

The method disclosed herein provides for a method and apparatus for converting cleared land into tilled soil with improved texture which soil is substantially free of organic matter and insect life. The organic matter and insect life are so pulverized by the apparatus disclosed herein that they are no longer a threat to planted seedlings in that they do not compete with said seedlings for nutrients and in fact, the pulverized organic matter and insect life provide nutrients for the seedlings planted subsequent to the use of the method disclosed herein. All of the aforementioned are accomplished in one pass by the apparatus disclosed herein and the soil which is removed to a predetermined depth by the apparatus disclosed herein is returned to the same swath from which it is removed. Further, the method disclosed herein, permits the addition of fertilizer or other plant nutrients to be blended with the processed soil before it is returned to the ground from which it is taken.

The processing of soil by the method and apparatus disclosed herein is accomplished by the use of one power driven vehicle which pulls forward a housing containing a leading cutting edge which is set to a predetermined depth. This cutting edge peels off a layer of top soil. The soil is then communicated to a power driven conveyor belt, as a result of the forward motion of the apparatus.

The soil is fed upwardly on the conveyor belt to a discharge point proximate to the idler wheel. At this point, the soil enters a second housing where large rocks and other large objects are first separated from the soil and then the soil and small rocks and pebbles are introduced to the crushing and pulverizing means The separation of rocks and other large objects is accomplished in the upper portion of the second housing by a row of rectangular, downwardly depending pins which rotate in a horizontal plane between upwardly depending inclined pins whose inclined surface is directed upwardly in the direction of rotation of the downwardly depending rectangular pins. This cooperation between pins serves to remove rocks and other large objects upwardly along the inclined surface.

The rocks and other large objects are contained while the soil and small pebbles fall downwardly through the second housing by means of gravitation, and are successively submitted to crushing and pulverizing by vertical rotatable discs which are also in rotation about the axis of the second housing in an intimate contact with planer surfaces supported within the housing.

Depending on the size of the housing, the soil may be submitted to several series of rotating discs however in the present invention, it has found that the submission of the soil to two series of rotating discs, as described more fully in the detailed description of the drawings, is sufficient to pulverize the soil so as to remove the threat of organic matter and insect life to the planted seedlings.

The soil, after the crushing and pulverizing steps is then returned to the swath from which it was taken by means of an opening in the bottom of the second housing wherein said opening is substantially identical in size to the swath cut by the leading cutting edge.

The entire apparatus is pulled by a standard farm vehicle and all the power driven accessories associated with the apparatus which will be disclosed more fully in the detailed description of the drawings, are capable of being run off of the power drive of the farm vehicle. In addition, quantities of soil may be processed by the apparatus in a stationary position with the processed soil being returned to its source by means of several conventional methods (i.e. truck). Further depending upon the condition of the soil, the separator means may not be required if there is an absence of rocks or other large materials. The detailed description contained herein includes the separator assembly.

DESCRIPTION OF THE DRAWING

The objects and advantages aforesaid as well as other objects and advantages may be achieved by the method and apparatus claimed herein, the preferred embodiments of which are illustrated in the drawing in which:

DETAILED DESCRIPTION

Figure 1:
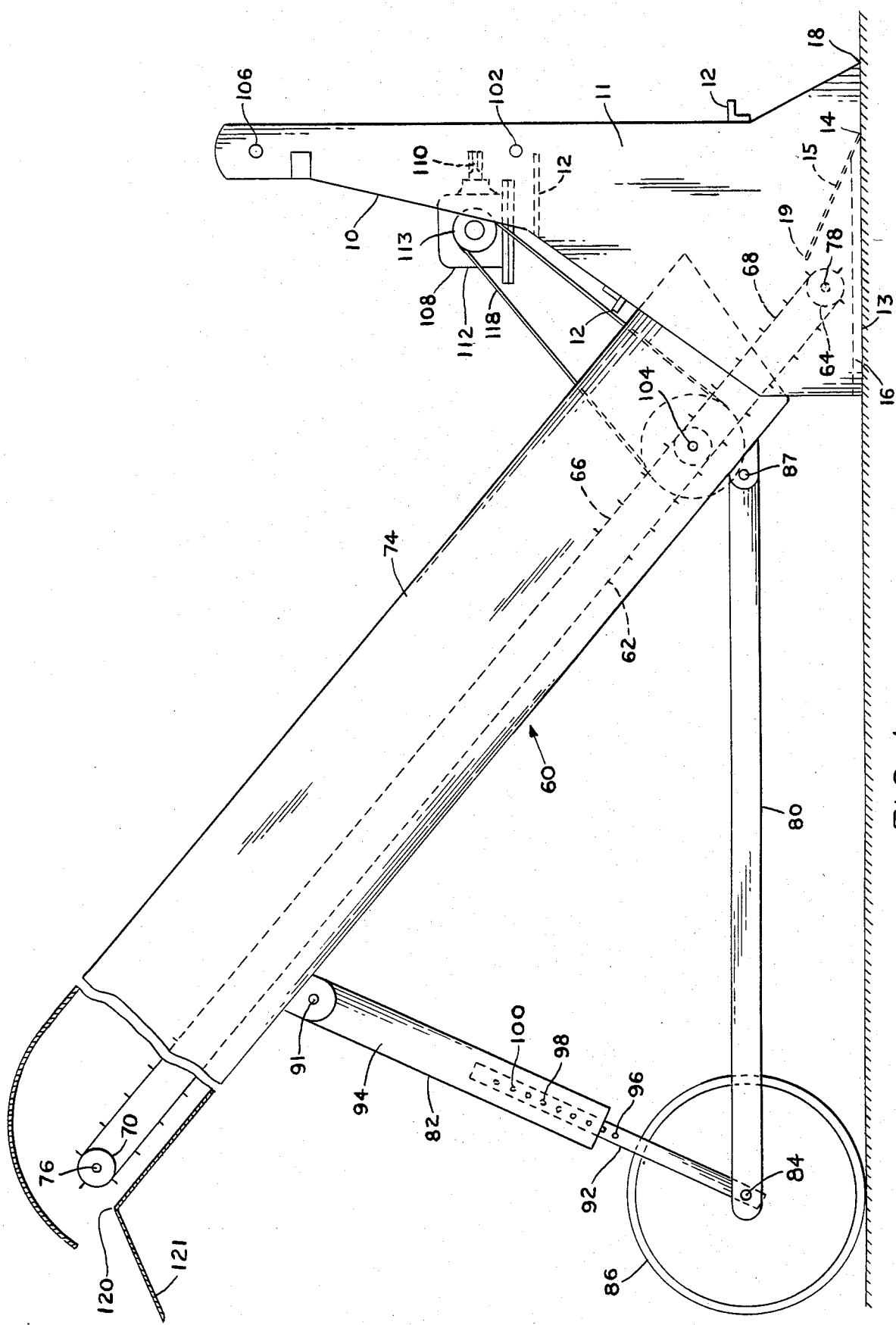
FIG. 1 is a side elevational view of the first housing and conveyor system.

Referring to FIG. 1, there is shown a side elevational view of the first housing 10 having sides 11 and a bottom 13. Housing 10 may be constructed of a suitable material such as steel or aluminum. Contained within housing 10 is blade 14 which has an upwardly rearwardly inclined slope 15. Blade 14 is secured to housing 10 such that blade 14 comprises the bottom 13 of housing 10. The side edges 16, of blade 14, are parallel and define the width of blade 14 as well as the width of housing 10. The distance between edges 16 will define the width of the swath of soil which will be cut by the apparatus The side edges 16 of blade 14 are in intimate contact and secured to sides of housing 10. Sides 11 of housing 10 have a forward extending lip 18 which extends outwardly and forwardly from blade 14 and serves to protect blade 14 from large solid objects which may serve to damage blade 14.

It is not necessary that housing 10 can be, although it completely enclosed. However, that portion of housing 10 proximate to blade 14 is necessarily required to be enclosed to a sufficient height since blade 14 is designed to cut under the swath of soil and lift it backwardly and upwardly to communication means 60.

Communication means 60 comprises a conveyor belt 62 having an idler wheel 64 mounted within housing 10 and in close proximity to blade 14 and inclined surface 15 such that the upper surface 66 of conveyor belt 62 when moving upwardly and rearwardly over idler 64 presents a planar surface proximate to the rearward edge 19 of inclined surface 15 such that the soil cut and lifted by blade 14 is communicated on to belt 66. Belt 66 contains a plurality of lips 68, which are projected outwardly from belt 62 and which serve to prevent the back sliding of soil on belt 62 during the belt's travel upwardly and rearwardly to idler wheel 70.

Conveyor belt 62 is contained within a housing 74 which substantially encloses conveyor belt 62 to prevent the soil being transported on belt 66 from being removed by wind and other forces.

Idler wheel 70 is journaled at 76, into the side of housing 74 and idler wheel 64 is journaled at 78 into the sides of housing 10.

Housing 74 is supported by horizontal strut 80 and adjustable strut 82. Horizontal strut 80 and adjustable strut 82 intersect at and are secured to axle 84 between support wheels 86 mounted on axle 84. The opposite end of horizontal strut 80, is rotatably secured to housing 74 by swivel pin 87. Adjustable strut 82 is rotatably secured to housing 74 at swivel pin 91.

Adjustable strut 82 comprises a first strut arm 92, and a second strut arm 94. Strut arm 92 is rotatably attached to axle 84 and is concentrically enclosed within strut arm 94 which is rotatably attached to housing 74 at swivel pin 91.

Strut arm 92 contains a plurality of openings 96 which openings are equal in cross-section area to a plurality of openings 98 in strut arm 94. Openings 96 and 98 are alignable for receipt of pins 100 in order to secure strut arm 82 at a desired length which in turn, establishes a predetermined angular incline theta for housing 74 and belt 62 conveyor.

While the shape of housing 10 is not critical to the present invention, the height thereof must be controlled in order to keep blade 14 in intimate cutting contact with the soil. To that end, the communication means between housing 10 and a locomoting vehicle is made by means of a three point hitch having two hitching points 102 at the same height on sides 11 respectively and hitching point 106 above the plane of hitching points 102. Hitching points 102 and 106 are fixed on housing 10 and fixed with respect to their attachment to the locomoting vehicle. Adjustable arm 82 is then adjusted by means of alignable openings 96 and 98 and pin 100 to provide the desired downward force on cutting blade 14 to assure taking an even and continuous cut of soil.

Mounted on housing 10 is gear box 108. Gear box 108 contains a power take-off 110 which is connected to the locomoting vehicle. Attached to gear box 108 is a drive means 112 which is connected to drive wheel 114 of conveyor belt 62. Drive wheel 114 is journaled 104 in the belt housing 74 and is driven by drive pulley 112 with gear box 108 serving to produce the required speed for drive pulley 112 and belt 118 with gear box 108 serving to produce the required speed for conveyor belt 62.

Located proximate to the top of conveyor belt housing 74 is opening 120. Opening 120 is on the underside of belt housing 74 to permit soil transported by belt 66 to fall downwardly under the action of gravitational flow after passing over idler wheel 70.

Figure 2:
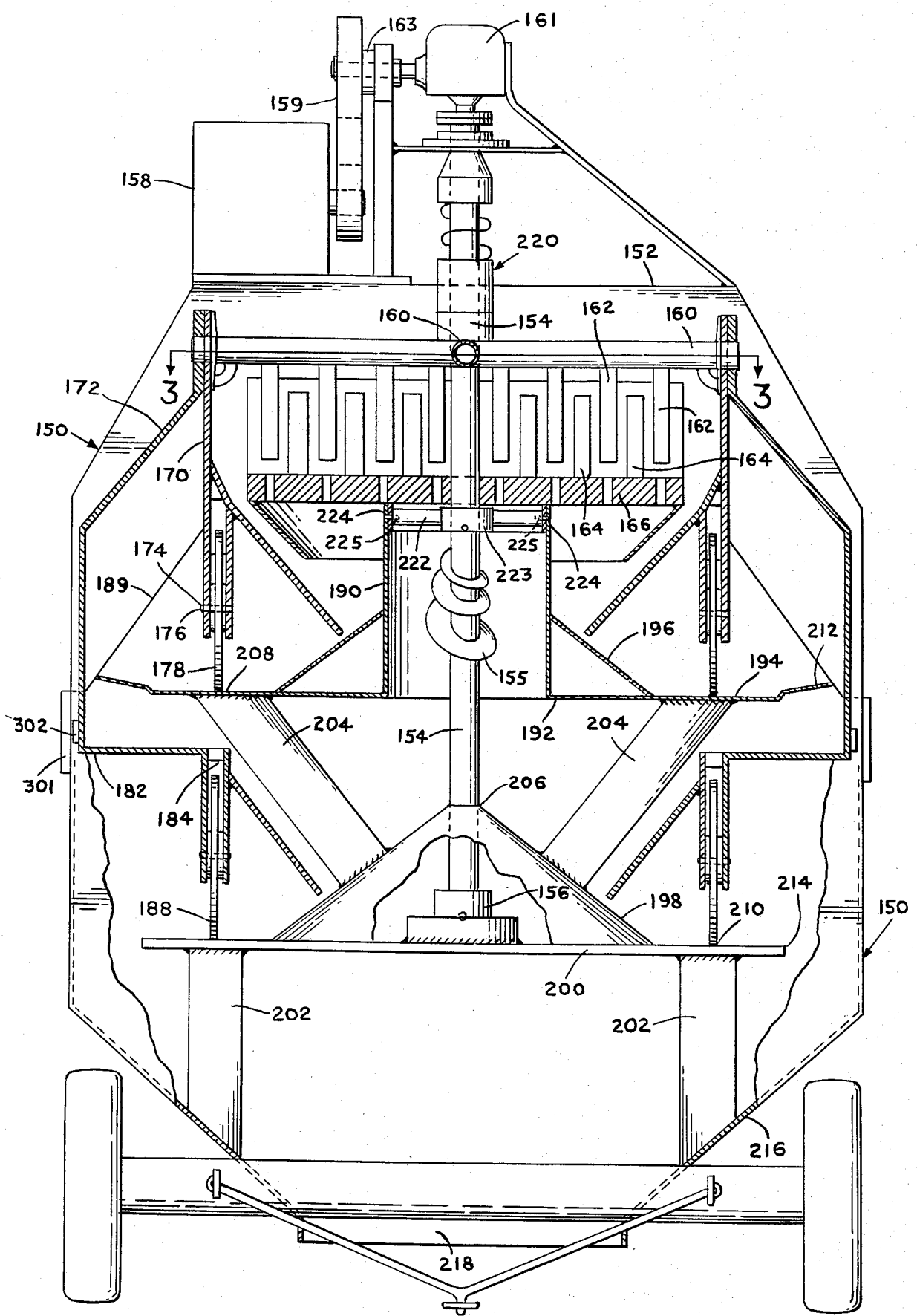
FIG. 2 is a front, cross-sectional view of the second housing.

Securedly attached to the underside of housing 74, proximate to opening 120 is guide plate 121 which serves to direct the soil for even distribution onto plate 166 contained in housing 150 as shown in FIG. 2. Guide plate 121 is right triangular in shape and overlaps opening 152 of housing 150 as shown in FIG. 2. In this configuration and as will be explained later, the soil is evenly distributed across plate 166 via guide plate 121.

The soil discharging through opening 120, falls under the influence of gravitation, into the separate housing 150 which contains the crushing and pulverizing means. Housing 150 has an opening 152 to permit the ingress of soil into housing 150. There is contained in housing 150, a central rotatable axle 154 which extends upwardly and outwardly from housing 150 and which is journaled at 156 on bottom support plate 200 of housing 150. Axle 154 is driven by a motor means 158 mounted on the top of housing 150 to permit axle 154 to be rotated at variable speeds.

Motor means 158 drives axle 154 by means of pulley 159 and gear box 161. Connected between pulley 159 and gear box 161 is slip clutch 163 for disengaging axle 154 from motor means 158. Secured perpendicularly to axle 154, proximate to the top of housing 150 but below opening 152 and motor means 158, are 4 perpendicular strut arms 160 which can be more easily seen in FIG. 3. Perpendicular strut arms 160 rotate with axle 154 and have depending downwardly from them, rectangular pins 162.

Figure 3:
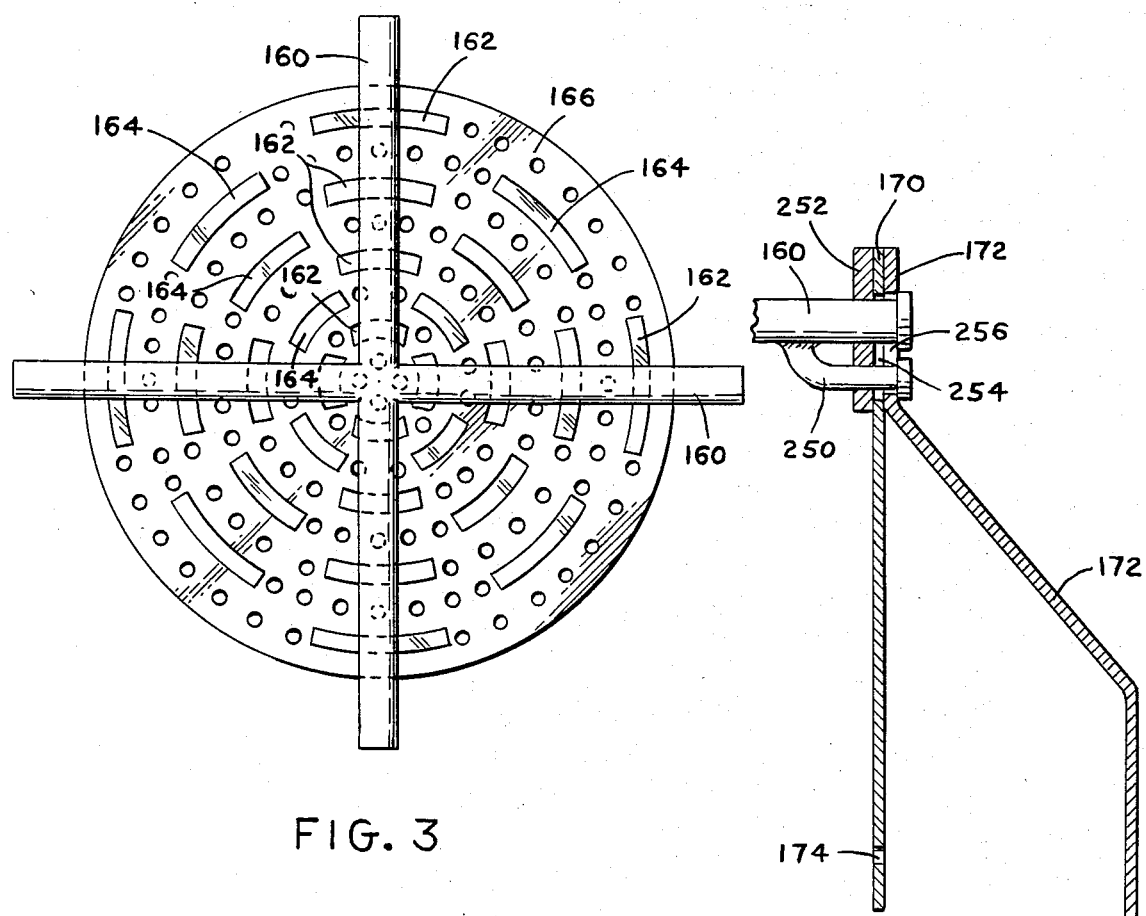
FIG. 3 is a top planar view of a separating mechanism contained in the second housing.

Mounted below strut arms 160 is separation plate 166. Upwardly extending pins 164 are mounted on plate 166 which plate is circular in configuration and contains a plurality of perforations 168 as shown in FIG. 3. Pins 162 are spaced along arms 160 so as to permit their passage between stationary, upwardly extending pins 164. Plate 166 in cooperation with pins 164 and 162 serves to separate large rocks or other large objects from the soil and to prevent such rocks and other large objects from blocking perforations 168. Upwardly extending pins 164 are inclined upwardly in the direction of rotation of axis 160 and are arcuate as shown in FIG. 3.

Depending downwardly from the ends of arms 160 is a vertical support arm 170 and a support arm 172. Vertical support arm 170 is slidably secured to arm 160 and has an opening 174 at the opposite end, for receipt of an axle pin 176 which secures a rotatable disc 178 to arm 170.

Support arm 172 is slidably secured to arm 160 and is angled to permit clearance around support arm 170 and disc 178. Support arm 172 has formed thereon L-shaped angles 182 and 184 and supports rotating disc 188, in a similar fashion to that of rotatable disc 178. The shape of support arm 172 is designed such that it permits rotating discs 178 and 188 to be substantially in alignment, one above the other. Rigid support arm 189 extends between support arm 170 and 172 to provide stability to the mechanism.

Depending downwardly from under plate 166, but not secured thereto is a cylindrical member 190 which depends downwardly and has extending outwardly therefrom, at lower end 192, an annular plate 194 which provides a planar surface which is in intimate contact with rotatable discs 178. There is contained a conical shaped member 196 depending angularly downwardly about cylindrical member 190 to plate 194.

A conical shaped sleeve 198, surrounds axle 154 at its lower journaled end 156 on bottom support plate 200. Bottom support plate 200 provides a circular planar surface and is supported by a plurality of strut members 202 extending upwardly from housing 150 and secured thereto. Extending upwardly from conical member 198, are a plurality of support arms 204 which provide additional support for annular plate 194. Conical member 198 forms a seal 206 with axle 154.

The path which soil takes as it enters housing 150, is to fall first onto circular plate 166. The rotation and interaction between pins 162 and 164 serves to remove large objects from the soil such that only the soil and small pebbles pass through openings 168. In that regard openings 168 are in the range of ⅛ to ¾ inch in diameter. In passing through openings 168, the soil closest to axle 154 falls downwardly under gravitational action to conical member 198. Rotably secured to axle 154 is helical member 155. Helical member 155 is secured to axle 154 below plate 166. Soil passing through perforations 168 which are in close proximity to axle 154 contact helical member 155 and are then dispersed evenly onto conical member 198. Soil farthest away from axle 154 on plate 166 falls downwardly under gravitation onto conical 196. The soil is thus divided and directed toward one of two sets of the rotating crushing discs 178 or 188. The soil is directed outwardly by conical shaped member 196 or conical shaped sleeve member 198, to rotating discs 178 or 188, where the crushing and pulverizing occurs at a point where the rotating disc contacts planar surface 194 at 208 or planar surface 200 at crushing point 210. The crushing and pulverizing occurs by the rotation of a plurality of discs 178 or 188 more fully described with reference to FIG. 5, over the soil pushing the soil outwardly from axle 154 towards lip 212 on plate 194 and lip 214 on plate 200. At this point, the soil and small pebbles have been crushed and pulverized and fall again under the influence of gravitation downwardly until it contacts the inwardly sloping conical bottom 216 of housing 150 at which point it is directed downwardly to opening 218 which is substantially identical in diameter to the width of blade 14 thereby returning the soil cut from the swatch, to the same swath from which it was cut.

Contained on axle 154, is clutch mechanism 220. In operation, rocks and other large objects which are fed into the apparatus are contacted by pins 162 and are pushed upwardly along the inclined surface 163 of pins 164 to remove them from plate 166 thereby permitting openings 168 to be free and open to permit the passage of soil therethrough.

As shown in FIG. 3, upwardly extending pins 164 are triangular in shape having an upward incline surface 163. Upwardly extending pins 164 are also arcuate about axle 154 so as to permit the passage therebetween of downwardly depending pins 162. Once there has been a sufficient buildup of rocks or other large objects as a result of the removal by means of the cooperation between pins 162 and 164, sufficient weight will have accumulated such that the clutch mechanism 220 will be disengaged and rotation of arms 160, will cease. The operator then must manually remove the accumulated material by means of opening 152, and begin operation again. The clutch mechanism 220 may be of a variety of designs well known in the art.

A second safety feature is incorporated into the design of the apparatus to prevent damage from excess weight which may accumulate on support plate 166 and upwardly extending pins 164. In this regard, plate 166 remains stationary in the normal operation of the apparatus. On the underside of plate 166, there is secured thereto, a plurality of support arms 222 which emanate radially outwardly from bearing 223 also secured to the underside of plate 166. Support arms 222 contain bores 224 at their ends for the receipt of shear pins 225. Cylindrical member 190 which is supported by support arms 204 and annular disc plate 194, contains openings 22 which coincide with bores 222 to permit the passage of shear pins 225 through cylindric member 190 and into bore 224 in support arms 222. Shear pins 100 cooperate with cylindrical member 190 which is nonrotatable, to maintain the nonrotatability of plate 166. However, should sufficient weight accumulate on plate 166 or an object become lodged between pins 162 and 164, shear pins 225 are of a determined strength such that they would break thereby permitting plate 166 and support arms 222 and bearing 223 to rotate freely.

Discs 178 and 188 are substantially identical in character and are a width of approximately ⅝ inch. The plurality of these discs and their support in interconnection is best shown in FIG. 4 and 5.

Figure 4:
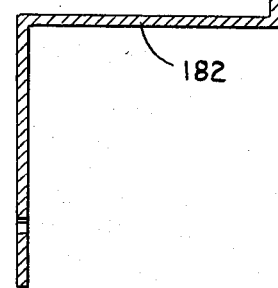
FIG. 4 is a side elevational view of the disc connection means.

FIG. 4 shows support arm 160 with extension arm 250. Secured to support arm 160 and extension support arm 250 is buffer plate 252 which is rigidly secured. Mounted outwardly from axis 154 there is next mounted support arm 170 and mounted outwardly from support arm 170, is support arm 172. Support arm 170 is slidably supported on support arm 160 and extension support arm 250 by means of slot 254 as can be best seen in FIG. 5. Support arm 172 is also slidably supported on support arm 160 and extension support arm 250 by means of slot 256. The function of slot 254 and 256 may best be explained with reference to FIG. 5. Likewise, FIG. 5 will describe the mounting means for discs 178 for both support arm 170 and support arm 172.

Figure 5:
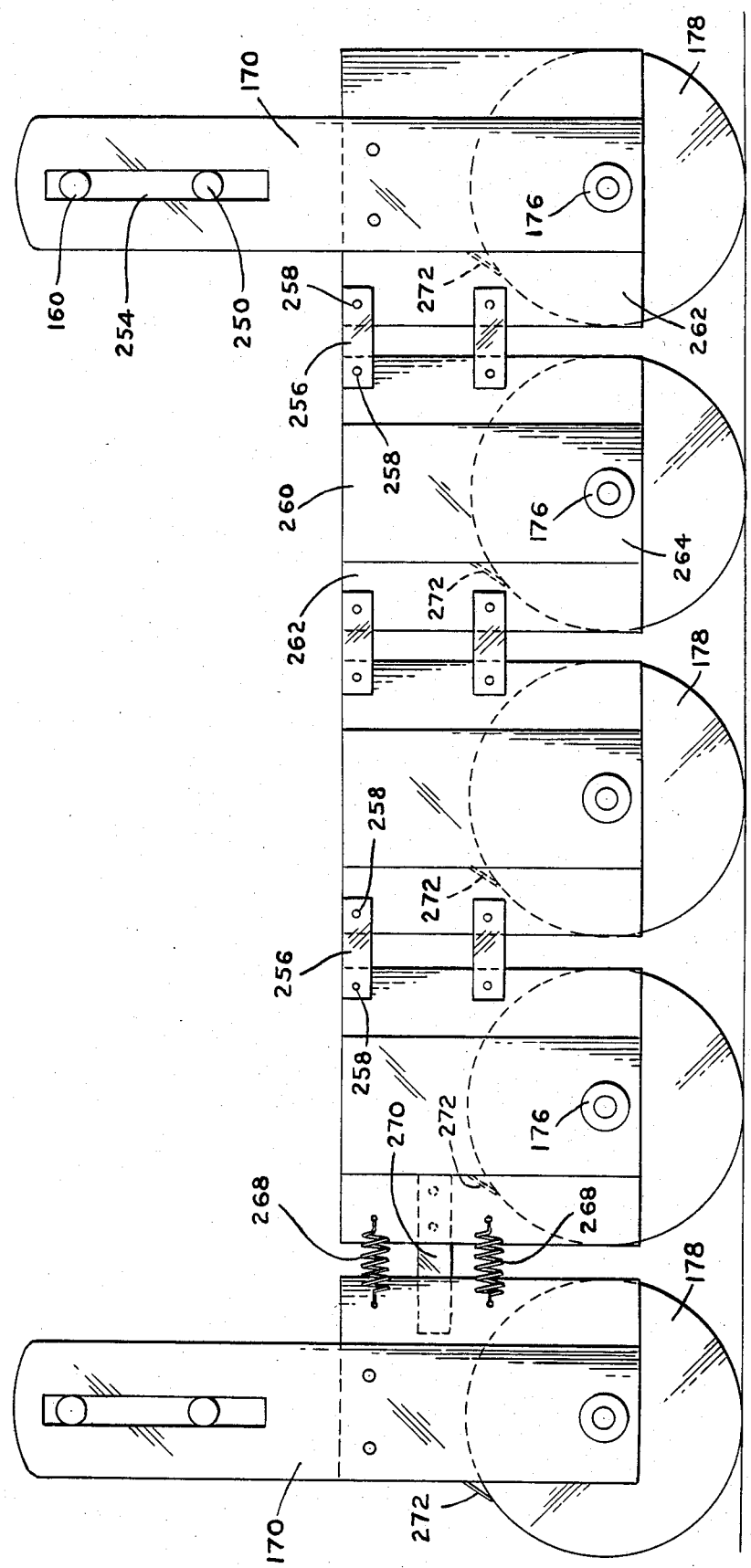
FIG. 5 is a side elevational view of the support means.

Referring now to FIg. 5, there is shown rotating disc 178 mounted between protective sleeve 260. Protective sleeve 260 comprises an inner surface 262 whose width is substantially equal to the diameter of disc 178, and an outer surface 264 whose width is less than the diameter of disc 178. Disc 178 is positioned between said sleeves and rotates about axle pin 176 which passes through said sleeves and said rotating disc. In the present embodiment of the present invention, there are are four support arms 170 depending downwardly from rotating support arms 160. Those discs 178 attached directly to support arm 170 are secured in the same manner by axle pin 176 passing through support arm 170 by means of opening 174.

Disc 178 which is attached directly to support arm 170, is slidably moveable upwardly and downwardly as a result of support arm 170 being slidably secured to support arm 160 and extension support arm 250. This permits disc 178 to move upwardly and downwardly in its crushing rotation upon the soil while moving about plate 194. It will be recognized that there are four such discs 178 which will be secured directly to a support arm 170 depending downwardly from rotating support arm 160. The remaining plurality of rotating discs are secured in series by means of sleeves 260 to that rotating disc 178 and its sleeve 260 attached directly to support 170. These subsequent discs 178, are secured by means of braces 256 secured at pivot points 258 on each succeeding inner surface 262 of sleeve 260. This means of connection permits each succeeding disc 178 to move upwardly and downwardly in crushing rotation upon surface 194.

The sleeve 260 of the last rotating disc in each series, would be connected to sleeve 260 of the initial rotating disc 178 of the next series, which disc 178 would be attached to a support arm 170, by means of a set of tension springs 268. Tension springs 268 permit each series of rotating discs to operate independently of each other and to prevent the interacting of one series of discs with another. Also mounted on the last sleeve 260 of rotating disc 178 in a series is a retaining bar 270. Retaining bar 270 is mounted securely to the sleeve 260 of the last rotating disc 178 in the series and is frictionally engaged with the first sleeve 260 of rotating disc 178 in the next series of discs. The retaining bar serves to maintain alignment of each series of discs during rotation about axle 154.

Mounted on each sleeve 260, slightly above rotating disc 178 and rearwardly from its axle of rotation, would be a knife edge 272 which would be in intimate contact with rotating disc 178 and permit soil and other matter accumulating on the disc to be removed.

In the present configuration, slots 254 on support arm 170 provide the means for slidable upward and downward movement with respect to disc 178 and such upward and downward movement is permitted of each succeeding disc by means of braces 256 pivotally mounted between successive sleeves 260. It will be recognized by those skilled in the art, that there are a variety of means which may be utilized to permit rotating discs, utilized in the processing of soil as disclosed in this invention, to move upwardly and downwardly to impact positive force upon soil and other small objects.

In the configuration as shown, it can be seen that each disc 178 rotates about its own axis while all discs 178 are rotated about central axle 154 of the housing. In this regard, rotating disc 178, in intimate contact with soil fed to plate 194 and rotating discs 178 accomplishes a crushing and pulverizing task. The same configuration and results are obtained by rotating disc 188 and their contact with plate 200 in performing the crushing and pulverizing task.

In order to accomplish the thorough and efficient task of crushing and pulverizing the soil and other small pebbles, it is necessary that the soil remain on respective plates 194 and 200 for a sufficient period of time. In that regard lip 212 of plates 194 and lip 214 of plate 200 extend outwardly approximately 4 inches beyond rotating discs 178 and 188 respectively.

Housing 150 is mounted on a suitable carriage 300 and connected to conveyor belt 66 and housing 10 such that the entire process is continuous. In operation, the entire apparatus will reach steady state in approximately 5 to 10 feet of movement by the locomotive force and thereafter, there will be a continuous flow of soil cut from the swath by cutting edge 14, transported by belt 66 to housing 150 and crushed and pulverized by rotating disc 178 and 188.

In operation, the size and weight of rotating discs 178 will depend upon the size of the equipment. Rotating discs 178 and 188 should be mounted such that the distance between the circumference of each succeeding disc is no more than one inch. The weight of the discs disclosed in the current embodiment would be approximately 8 inches in diameter and ⅜ of an inch thick.

In operation, under rotation, housing 150 would have mounted circumferentially on the outside, a circumferential reinforcing band 301. The position of reinforcing band 300 on housing 150 would coincide with the mounting of contact plates 302 on support arm 172. Contact plates 302 provide an intermittent, intimate contact with housing 150 to oppose any outward movement of support arm 176 during the rotation of the apparatus.

It will be recognized by those skilled in the art that there may be slight deviations from the detailed description contained herein without deviating from the basic thrust of the invention.

Further depending upon the condition of the soil the separator means may not be required to be utilized unless there is the presence of rocks or other large objects.

Still further it will be recognized by those skilled in the art that the apparatus may be used in a stationary position with the soil brought to the apparatus and returned to its original site by conventional means (i.e. truck).

I claim:
1. An apparatus for processing soil by mechanical means comprising:
   a. a housing having a top portion with an aperture located therein, a bottom portion with an aperture located therein, for the respective gravitational ingress and egress of a quantity of soil, a plurality of planar surfaces, supported within said housing; a vertical rotatable power drive shaft centrally located in said housing with said shaft having a plurality of radially extending support arms rotatable therewith, said arms having supported thereon, a crushing means comprising a plurality of rotating discs in series rotating about said vertical power driven shaft, on said plurality of planar surfaces;
   b. separating means supported by said plurality of radially extending support arms, said radially ex- tending arms having secured thereto, downwardly extending pins; a disc plate mounted about said power driven shaft and having a plurality of openings therein for the passage therethrough of said soil and having extending upwardly therefrom a plurality of arcuate inclined pins, said upwardly extending arcuate inclined pins cooperating with said downwardly extending pins to separate the rocks and other large objects from the soil; and, c. means for communicating said soil to said top portion aperture.

2. An apparatus according to claim 1 wherein said disc plate and upwardly depending arcuate inclined pins are secured by breakable shear pins to prevent rotation of said disc plate and said upwardly arcuate inclined pins as required to protect the apparatus.

3. An apparatus in accordance wtih claim 1 wherein said plurality of said rotating crushing means comprises a plurality of slidable support arms depending from said plurality of radially extending arms each of said depending support arms having attached thereto a rotating disc, said rotating disc having attached thereto a plurality of said rotating discs to form a series of rotating discs, said series of rotating discs attached to said rotating disc of a subsequent support arm to define a circular series of rotating discs, said rotating discs in contact with said plurality of horizontal planar surfaces.

4. An apparatus according to claim 3 wherein said plurality of rotating discs rotate about their own axis and about said vertical power driven shaft on said planar surfaces and wherein said rotating disc attached to said support arm is movable upwardly and downwardly by means of slidable support arms for travelling over soil and said downward movement being restricted by said planar surface.

5. An apparatus according to claim 4 wherein said plurality of rotating discs in series secured to said rotating disc of said support arm are pivotally secured to permit upward and downward movement, said downward movement being restricted by said planar surface.

6. An apparatus according to claim 5 wherein said plurality of rotating discs in series are secured to subsequent plurality of rotating discs in series by means of tension springs.

7. An apparatus according to claim 1 wherein said planar surfaces have means for directing soil to said plurality of rotating discs said means for direction comprising an inclined conical surface extending radially from said vertical power driven shaft.

8. An apparatus according to claim 1 wherein the circumference of said planar surfaces is greater than the circumference of the circular series of said plurality of rotating discs.

9. An apparatus according to claim 1 wherein said vertical power driven shaft has secured thereto a means for distributing soil evenly onto said planar surfaces, said means for distributing soil are comprised of a rotating conical distributor.

10. An apparatus according to claim 1 wherein said means for communicating said soil to said top portion aperture is continuous and comprises an adjustable inclined conveyor belt contained within a second housing, said second housing having secured thereto, an adjustable blade and forward cutting edge, said blade and cutting edge adjustable to a predetermined depth beneath the surface of the soil and said second housing having an opening proximate said blade and forward cutting edge for the ingress of soil cut from the surface and a second opening for the egress of soil from said adjustable inclined conveyor belt to said crushing means.

11. An apparatus according to claim 10 wherein said blade and forward cutting edge are urged forward by driving means.

12. An apparatus according to claim 11 wherein said second housing and first housing are propelled by said driving means, said driving means comprising a driving vehicle.

* * * * *